(12) United States Patent
Middleton

(10) Patent No.: US 6,960,293 B2
(45) Date of Patent: Nov. 1, 2005

(54) WASTE PROCESSING SYSTEM

(76) Inventor: Richard G. Middleton, 124 Sparkman Dr., Columbia, SC (US) 29209

(*) Notice: Subject to any disclaimer, the term of this patent is extended or adjusted under 35 U.S.C. 154(b) by 0 days.

(21) Appl. No.: 10/983,814

(22) Filed: Nov. 8, 2004

(65) Prior Publication Data

US 2005/0061754 A1 Mar. 24, 2005

Related U.S. Application Data

(63) Continuation-in-part of application No. 10/264,365, filed on Oct. 4, 2002, now abandoned.
(60) Provisional application No. 60/327,652, filed on Oct. 4, 2001.

(51) Int. Cl.[7] .............................................. B01D 17/02
(52) U.S. Cl. ..................... 210/173; 210/177; 210/178; 210/241; 210/248; 210/773; 210/774; 241/65; 241/46.01; 366/174.1; 366/175.2
(58) Field of Search ................................ 210/173, 175, 210/177, 178, 187, 220, 241, 248, 519, 532.1, 533, 534, 773, 774, 799, 800, 803; 241/38, 39, 40, 65, 46.01; 366/174.1, 175.2

(56) References Cited

U.S. PATENT DOCUMENTS

| | | | |
|---|---|---|---|
| 3,623,976 A | 11/1971 | Cessna | |
| 4,013,516 A | 3/1977 | Greenfield et al. | |
| 4,040,958 A | 8/1977 | Rammier | |
| 4,548,525 A | 10/1985 | Priebe | |
| 4,975,195 A | 12/1990 | Urbani | |
| 5,098,584 A | 3/1992 | Leen | |
| 5,928,524 A | 7/1999 | Casola | |
| 6,206,203 B1 | 3/2001 | Hopkins et al. | |
| 6,315,903 B1 | 11/2001 | Noyes | |

*Primary Examiner*—Robert James Popovics
(74) *Attorney, Agent, or Firm*—Sara A. Centioni; Michael A. Mann; Nexsen Pruet, LLC

(57) ABSTRACT

A system and method for pre-treating grease and other similar wastes prior to introducing them into a waste water treatment facility so that the grease, etc., does not clog the waste water treatment facility equipment. The system includes a tank for receipt of the grease that has an inlet pipe equipped with water jets and emulsifying blades that emulsify and dilute the grease in hot water as it enters the tank. The dilute waste then can be drawn through a drain pipe by opening a valve to allow it to enter the waste water processing equipment.

10 Claims, 1 Drawing Sheet

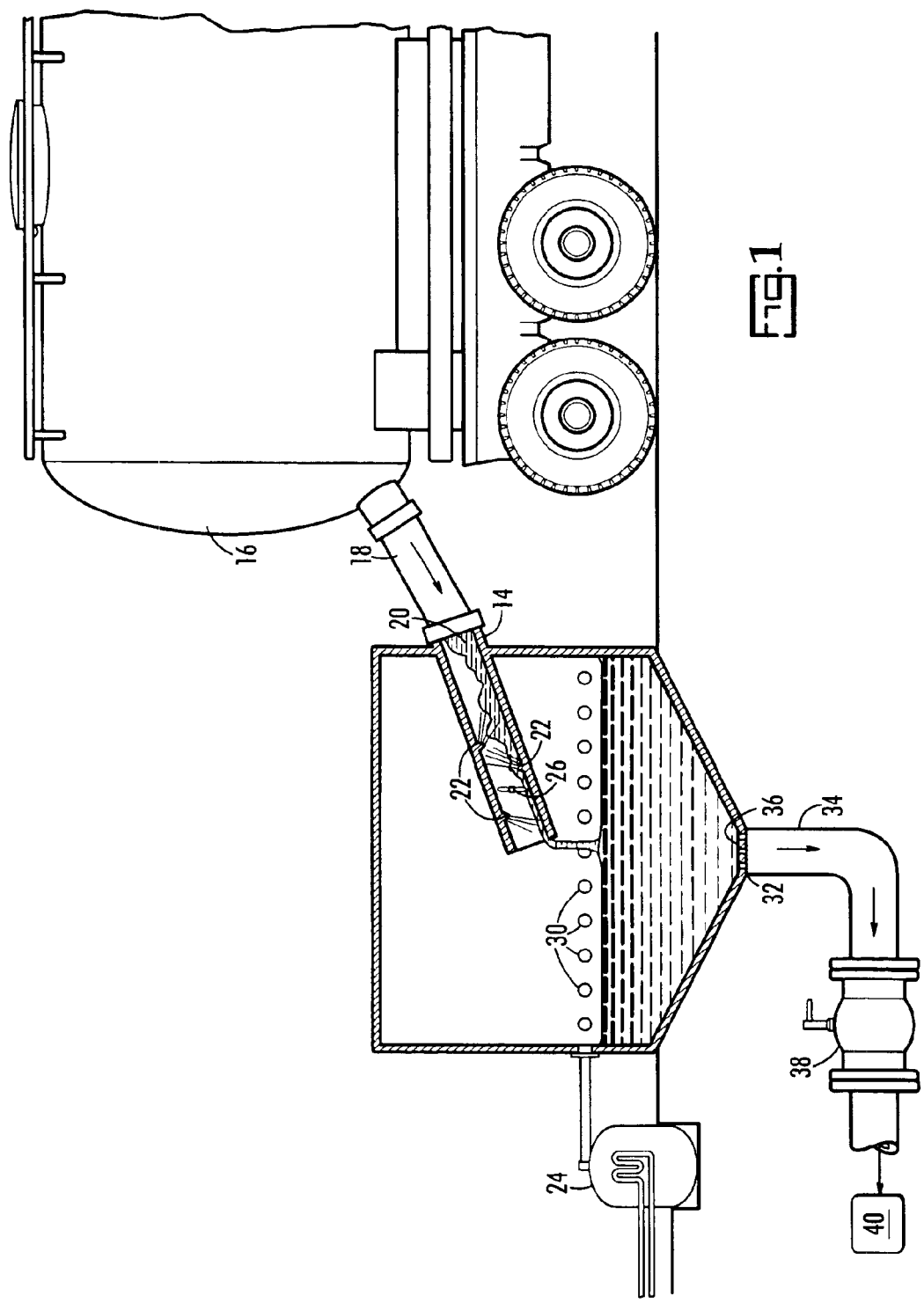

WASTE PROCESSING SYSTEM

CROSS REFERENCE TO RELATED APPLICATIONS

The present invention is a continuation-in-part of and claims the benefit of priority of U.S. application Ser. No. 10/264,365, now abandoned filed on Oct. 4, 2002, which is a nonprovisional application claiming the benefit of U.S. Application No. 60/327,652, filed on Oct. 4, 2001.

STATEMENT REGARDING FEDERALLY SPONSORED RESEARCH OR DEVELOPMENT

Not Applicable.

REFERENCE TO A SEQUENCE LISTING, A TABLE, OR A COMPUTER PROGRAM LISTING COMPACT DISK APPENDIX

Not Applicable.

BACKGROUND OF THE INVENTION

Generally, the present invention relates to waste handling and processing, and, more particularly, the present invention relates to the processing of semi-solid wastes.

Many wastes are collected in a semi-solid form; that is, they are slowly flowing liquids, wastes near a transition temperature so that they are in both solid and liquid phases, or wet solids. To process these wastes invariably requires their movement from one place to another, such as from a waste collection tank to a processing tank. Normally, receiving system is designed for the nature of the wastes being transferred to it. Sometimes, however, it is not.

For example, cooking grease is often disposed of into water collection systems. The used grease is stored temporarily on the premises of a restaurant or commercial kitchen until it can be taken away. These wastes are collected in truck-mounted tanks ("grease trucks") or in drums, and then hauled to a water treatment facility where they are added to the water collected from storm sewers and drains for processing.

Grease, particularly grease that has solidified, will clog wastewater processing equipment and halt water processing operations until the equipment can be degreased. Thus there remains a need for way to introduce the grease and similar types of wastes into the wastewater processing equipment so that they do not clog it.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

According to its major features and briefly recited, the present invention is a method and apparatus for handling and processing grease and other semi-solid and solid wastes. The method includes combining and diluting the semi-solid wastes with water, preferably hot water under pressure, so that they flow quickly to a processing facility or to the environment, if permitted. To combine the grease with water, the grease may be emulsified in the water using rotating blades and jets of water.

The apparatus includes an inclined pipe leading from a truck or hopper containing grease to a tank, emulsifying blades and jets for directing high speed volumes of water into the grease as it enters the pipe, a filter drain to remove particles, a drain pipe in fluid communication with the interior of the tank for carrying off the dilute, emulsified grease-containing water, a valve for controlling the drain pipe, and a source of hot water. Preferably, water is recovered from the processing of the grease-containing water for reuse.

The present invention has industrial applicability. The invention can be employed in a number of industries in which the disposal and processing of semi-solid waste is required. For example, many restaurants employ grease in their operations. The present system provides for a convenient and efficient way to remove such grease and process it so that it does not become an environmental issue.

A feature of the present invention includes the use of water to dilute the grease before the grease enters the waste water processing equipment. This feature prevents clogging of the equipment.

Another feature of the present invention includes the use of hot water in combination with emulsifying blades, in a preferred embodiment, to dilute the grease. This feature assures that the grease will be diluted quickly and thoroughly before it enters the wastewater processing system.

Yet another feature of the present invention includes the use of a plurality of jets that are positioned so as to most effectively dilute the grease and transport the grease for processing.

Other features and their advantages will be apparent to those skilled in the art of waste water processing from a careful reading of the Detailed Description of Preferred Embodiments, accompanied by the FIGURE.

BRIEF DESCRIPTION OF THE DRAWING

In the drawings,

FIG. 1 is a schematic, partially cutaway view of a waste water and grease processing system, according to a preferred embodiment of the present invention.

DETAILED DESCRIPTION OF PREFERRED EMBODIMENTS

The present invention includes a system and method for pre-treating grease and other similar types of waste before they are introduced into a waste water processing facility. Wastewater processing facilities receive aqueous wastes from a variety of sources including storm drains and waste water lines from sewage systems. This waste is processed to separate water from particles and other solid debris and to process chemicals carried in the water, such as detergents, oils and grease.

Grease, such as cooking grease, may be liquid or solid or near a phase change at ambient temperatures. On cold days, grease may be quite solid when introduced into the wastewater treatment facility. The present system "pre-treats" the grease so that it can be received by the wastewater processing equipment without clogging that equipment.

As illustrated in FIG. 1, the present system 10 includes a container such as a tank 12 with a pipe 14 extending into it and adapted to be coupled to a grease truck 16 or to a hopper into which the contents of drummed grease can be poured. In particular, the pipe 14 can be connected to and in fluid communication with the grease truck 16 through the use of an effluent hose 18. The pipe 14 is dimensioned to receive an amount of grease 20 and can be approximately 2 inches in diameter or greater. Although a variety of materials can be employed, the pipe 14 is preferably made of stainless steel or coated metals, such as metals coated in TEFLON®, wherein the surface of the metal facilitates the flow of grease 20 through the pipe 14 and into the tank 12. The tank 12 is preferably located so that gravity further assists in the movement of the grease 20.

The pipe 14 of the present invention further includes interior features to assist the transport of the grease 20 from the grease truck 16 and into the holding tank 12. As shown, along the interior of the pipe 14 are included plural jets 22 of water. These jets 22 can be deployed about the interior of the pipe 14 and oriented so as to be able to direct the jets 22 of water into the grease 20. For example, the plural jets 22 of water can include a jet of water that is angled so that water is directed towards the entry point of the pipe 14. The grease-containing waste tends to be most agglomerated and slow moving upon its entry. Therefore, directed the jets 22 of water to this area of the pipe 14 helps to push the grease 20 into the tank 12 by breaking it up and beginning to dilute it with water. Preferably the jets are in fluid communication with a source of hot water, such as a dedicated hot water heater or boiler 24. Preferably the water can be in excess of approximately 100 degrees Fahrenheit and, most preferably, in excess of approximately 140 degrees Fahrenheit.

In addition to the use of plural jets 22 along the interior of the pipe 14, emulsifying blades 26 can be mounted to the interior of the pipe 14 to help mix the hot water with the grease 20. The emulsifying blades 26 are especially useful in colder climates or when the grease 20 is of a type that is more likely to be solid at local, ambient temperatures. Depending on the thickness of the grease 20 entering the pipe 14, the pipe may include an arrangement of alternating plural jets 22 and emulsifying blades 26, wherein a first jet is next to a first blade, which is next to a second jet, and so forth. This arrangement may facilitate the dilution of the grease 20 within the pipe 14.

Upon traveling through the pipe 14, the emulsified, diluted grease 20 can then enter into the tank 12. If required, additional water can be added through a plurality of small ports 30 in the wall of the tank 12. Further, this water can be added under pressure to help in maintaining the dispersion of the grease 20 in the water. Because, the grease 10 in the water should not be allowed to stand for too long as it will cool and tend to separate from the water, the water ports 30 near the upper part of the tank 12 can be used to re-dilute separated grease 30. The water added to the grease 20 through the jets 22 or the ports 30 does not have to be clean water but can be water from a storm sewer that has had minimal filtering. Alternatively, it can be water following processing or water drawn off the tank itself.

Once the tank 12 is filled with the diluted grease 20, the grease 20 can be removed from the tank 12 for disposal or further processing. As shown, the base of the tank 12 can include an outlet 32 that is in fluid communication with a drain pipe 34. The outlet 32 of the tank 12 can include a grate or filter 36 for use in removing any larger particulate that might clog the system. The drain pipe 34 can also be in fluid communication with a disposal facility or waste processing system 40. In operation, the drain pipe 34 can release the contents of the tank 12 to the waste processing system 40 through the opening and closing a valve 38 connected to both the drain pipe 34 and the waste processing system 40. Preferably, the drain pipe 34 is in fluid communication with a waste processing unit or system 40.

It will be apparent to those skilled in water processing that many modifications and substitutions can be made to the foregoing preferred embodiments without departing from the spirit and scope of the invention, defined by the appended claim.

What is claimed is:

1. An apparatus for pre-treating wastes containing grease before they are introduced into a waste water processing facility, comprising:

a tank;

a pipe having an inlet and extending into said tank, said pipe containing plural jets and emulsifying blades, wherein said plural jets are in fluid communication with a source of hot water, and wherein said plural jets direct water provided by said hot water source toward said inlet of said pipe; and a grease truck, said grease truck having an effluent hose that is coupled with said pipe.

2. The apparatus as recited in claim 1, wherein said pipe is at least two inches in diameter.

3. The apparatus as recited in claim 1, wherein said water provided by said hot water source is greater than approximately 100° F.

4. The apparatus as recited in claim 1, wherein said water provided by said hot water source is greater than approximately 140° F.

5. The apparatus as recited in claim 1, wherein said hot water source is a boiler.

6. The apparatus as recited in claim 1, wherein said tank includes plural ports.

7. The apparatus as recited in claim 1, wherein said tank is connected to a waste processing system by a drain pipe and a valve, said tank being in fluid communication with said waste processing system.

8. The apparatus as recited in claim 7, wherein said drain pipe includes a filter.

9. The apparatus as recited in claim 1, wherein said pipe is inclined.

10. The apparatus as recited in claim 1, wherein said plural jets and said emulsifying blades are alternating such that one emulsifying blade of said emulsifying blades is located between two jets of said plural jets.

* * * * *